(12) United States Patent
Kupratis et al.

(10) Patent No.: US 9,103,227 B2
(45) Date of Patent: Aug. 11, 2015

(54) GAS TURBINE ENGINE WITH FAN-TIED INDUCER SECTION

(75) Inventors: Daniel Bernard Kupratis, Wallingford, CT (US); Frederick M. Schwarz, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 836 days.

(21) Appl. No.: 13/406,819

(22) Filed: Feb. 28, 2012

(65) Prior Publication Data

US 2013/0224003 A1 Aug. 29, 2013

(51) Int. Cl.
*F02C 3/10* (2006.01)
*F01D 15/12* (2006.01)
*F02C 7/36* (2006.01)
*F02K 3/072* (2006.01)
*F02C 7/047* (2006.01)

(52) U.S. Cl.
CPC . *F01D 15/12* (2013.01); *F02C 7/36* (2013.01); *F02K 3/072* (2013.01); *F02C 7/047* (2013.01); *F05D 2260/40311* (2013.01)

(58) Field of Classification Search
CPC .............. F01D 15/12; F01D 1/04; F02K 3/06; F02K 3/072; F02C 7/047; F02C 7/32; F02C 7/36; F05D 2260/40311
See application file for complete search history.

(56) References Cited

U.S. PATENT DOCUMENTS

| 3,903,690 A * | 9/1975 | Jones ........................... 60/39.08 |
| 5,279,109 A | 1/1994 | Liu et al. |
| 7,726,113 B2 * | 6/2010 | Orlando et al. ............ 60/39.162 |
| 7,927,075 B2 | 4/2011 | Suciu et al. |
| 2003/0167750 A1 * | 9/2003 | Bornhoft et al. ............. 60/226.1 |
| 2007/0084186 A1 | 4/2007 | Orlando et al. |
| 2008/0219833 A1 | 9/2008 | Suciu et al. |
| 2008/0226453 A1 | 9/2008 | Nordeen et al. |
| 2009/0056306 A1 | 3/2009 | Suciu et al. |
| 2009/0151317 A1 * | 6/2009 | Norris et al. ............... 60/39.162 |
| 2010/0154383 A1 | 6/2010 | Ress, Jr. |
| 2011/0130246 A1 | 6/2011 | McCune et al. |
| 2011/0167791 A1 | 7/2011 | Johnson et al. |

FOREIGN PATENT DOCUMENTS

| EP | 1887199 A2 | 2/2008 |
| EP | 1939430 B1 | 7/2008 |

OTHER PUBLICATIONS

International Preliminary Report on Patentability for International Application No. PCT/US2013/025802 mailed on Sep. 12, 2014.
International Search Report and Written Opinion for International Application No. PCT/US2013/025802 completed on Nov. 6, 2013.

* cited by examiner

*Primary Examiner* — Edward Look
*Assistant Examiner* — Aaron R Eastman
(74) *Attorney, Agent, or Firm* — Carlson, Gaskey & Olds, PC

(57) ABSTRACT

A gas turbine engine includes a shaft, a speed change device driven by the shaft, and a fan including a fan rotor driven by the speed change device. At least one inducer stage is positioned aft of the fan and is coupled for rotation with the fan rotor.

27 Claims, 3 Drawing Sheets

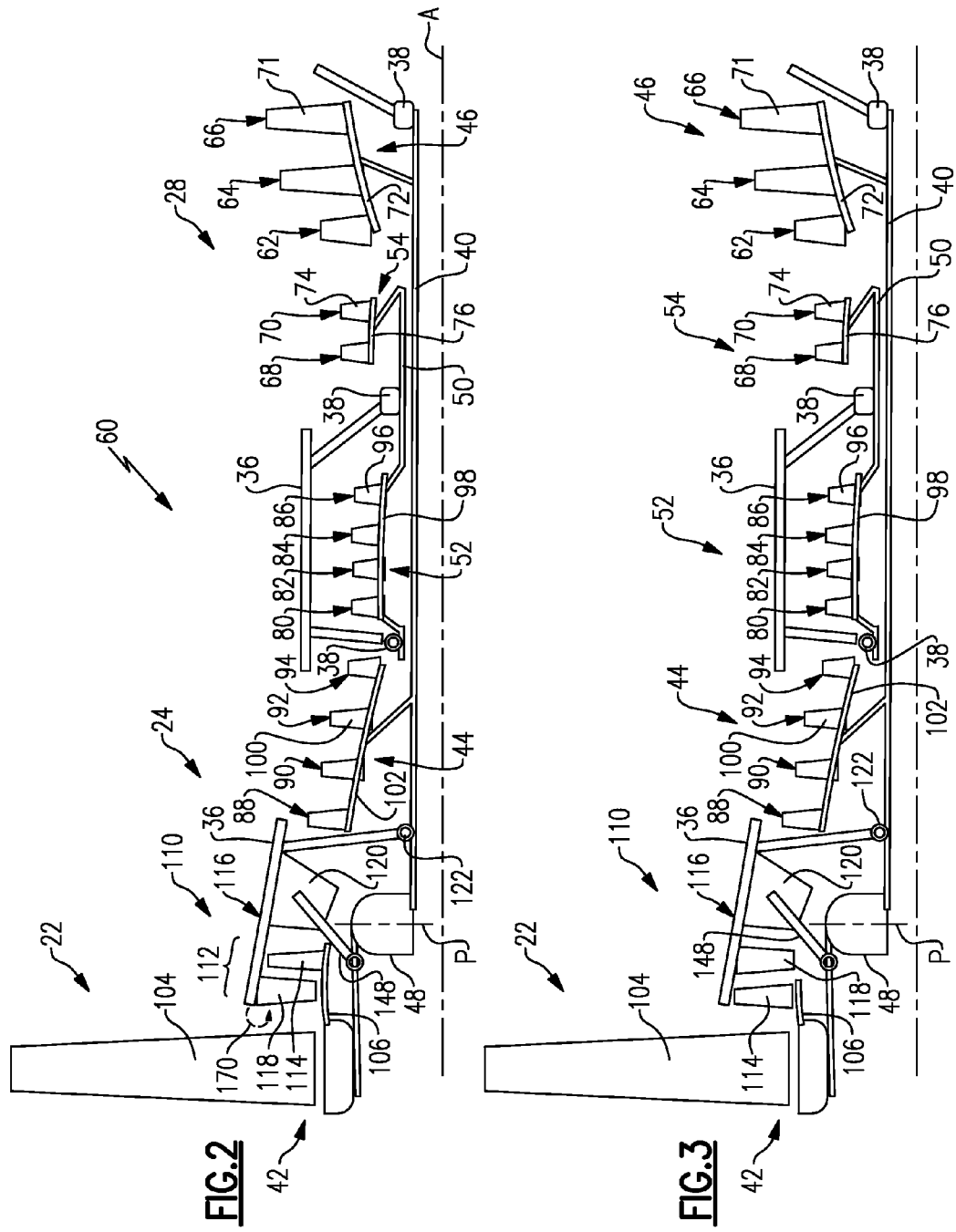

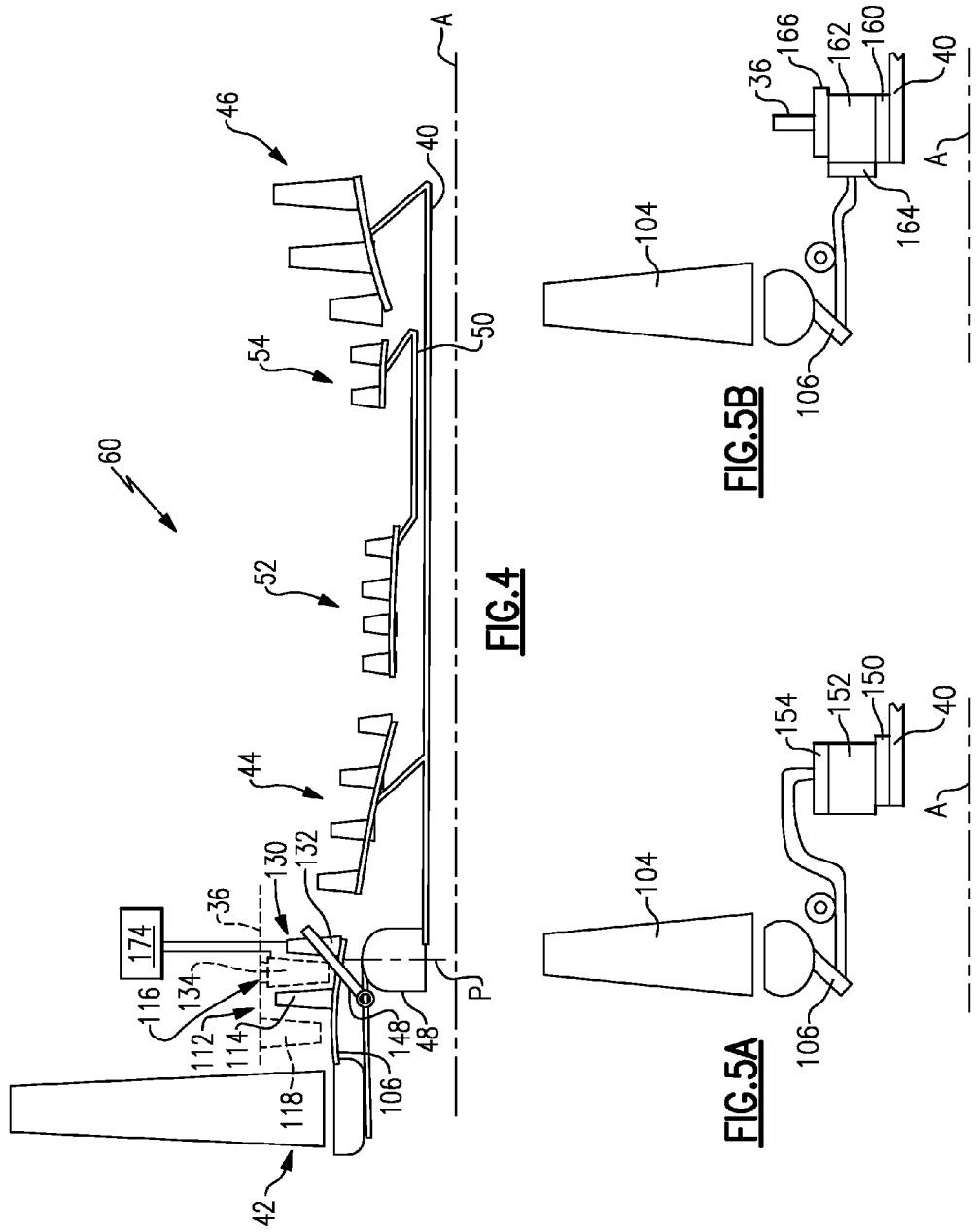

GAS TURBINE ENGINE WITH FAN-TIED INDUCER SECTION

BACKGROUND OF THE INVENTION

This disclosure relates to a gas turbine engine with a fan-tied inducer section.

A typical jet engine has multiple shafts or spools that transmit torque between turbine and compressor sections of the engine. In one example, a low speed spool generally includes a low shaft that interconnects a fan, a low pressure compressor, and a low pressure turbine.

The low pressure turbine drives the low shaft, which drives the low pressure compressor. A geared architecture connects the low shaft to the fan. Air exiting the fan at the root has relatively low energy, which generates a swirling effect that makes it difficult to efficiently feed air into the low pressure compressor.

SUMMARY OF THE INVENTION

In one exemplary embodiment, a gas turbine engine includes a shaft defining an axis of rotation, a speed reduction device driven by the shaft, and a fan including a fan rotor driven by the speed reduction device. At least one inducer stage is positioned aft of the fan and coupled for rotation with the fan rotor.

In a further embodiment of the above, the at least one inducer stage comprises one or more inducer blades fixed for rotation with the fan rotor and a core inlet stator fixed to a non-rotating engine structure.

In a further embodiment of any of the above, the core inlet stator is positioned axially between the fan and the inducer blades.

In a further embodiment of any of the above, the core stator is positioned aft of the blades.

In a further embodiment of any of the above, the at least one inducer stage comprises a plurality of inducer stages coupled to the fan rotor.

In a further embodiment of any of the above, each inducer state comprises one or more blades fixed for rotation with the fan rotor and a core stator fixed to a non-rotating engine structure.

In a further embodiment of any of the above, the gas turbine engine includes a compressor comprising a plurality of compressor stages driven by the shaft.

In a further embodiment of any of the above, the compressor is positioned immediately aft of the at least one inducer stage.

In a further embodiment of any of the above, the at least one inducer stage is positioned forward of the speed reduction device.

In a further embodiment of any of the above, the compressor comprises a low pressure compressor, and the gas turbine engine includes a high pressure compressor positioned aft of the low pressure compressor and driven by a second shaft positioned radially outwardly relative to the shaft that drives the low pressure compressor.

In a further embodiment of any of the above, the core inlet stator is a variable vane.

In a further embodiment of any of the above, the core inlet stator is heated for anti-icing.

In a further embodiment of any of the above, the one or more inducer blades are heated for anti-icing.

In a further embodiment of any of the above, the fan rotor turns in the same direction as the shaft.

In a further embodiment of any of the above, the fan rotor turns in an opposite direction from the shaft.

In a further embodiment of any of the above, the speed change device comprises a gearbox including a sun gear in meshing engagement with star gears and a ring gear in meshing engagement with the star gears, and wherein the ring gear drives the fan.

In a further embodiment of any of the above, the speed change device comprises a gearbox including a sun gear in meshing engagement with a plurality of planetary gears supported by a planet carrier, and a ring gear in meshing engagement with the planet gears, and wherein the ring gear is fixed and the planet carrier provides input to the fan.

In another exemplary embodiment, a gas turbine engine includes a shaft defining an axis of rotation, a speed change device driven by the shaft, a fan section including at least one fan blade coupled to a fan rotor wherein the fan rotor is driven by the speed change device, and a compressor comprising a plurality of compressor stages driven by the shaft. At least one inducer stage is positioned aft of the fan blade and coupled for rotation with the fan rotor about the axis of rotation.

In a further embodiment of any of the above, the at least one inducer stage is positioned axially forward of the compressor.

In a further embodiment of any of the above, the compressor comprises a low pressure compressor, and including a high pressure compressor positioned aft of the low pressure compressor and driven by a second shaft positioned radially outwardly relative to the shaft that drives the low pressure compressor.

In a further embodiment of any of the above, the low pressure compressor is positioned aft of the speed change device.

In a further embodiment of any of the above, the at least one inducer stage comprises one or more inducer blades fixed for rotation with the fan rotor and a core inlet stator fixed to a non-rotating engine structure.

In a further embodiment of any of the above, the core inlet stator is positioned axially between the fan blades and the inducer blades.

In a further embodiment of any of the above, the core inlet stator is positioned aft of the inducer blades.

In a further embodiment of any of the above, the at least one inducer stage comprises a plurality of inducer stages coupled to the fan rotor, and wherein each inducer stage comprises one or more inducer blades fixed for rotation with the fan rotor and a core inlet stator fixed to a non-rotating engine structure.

In a further embodiment of any of the above, the compressor is positioned aft of the at least one inducer stage.

In a further embodiment of any of the above, the at least one inducer stage is positioned forward of the speed change device.

These and other features of this application will be best understood from the following specification and drawings, the following of which is a brief description.

BRIEF DESCRIPTION OF THE DRAWINGS

FIG. 2 is one example of a schematic representation of an engine upper half including an inducer section coupled to a fan.

FIG. 3 is another example of a schematic representation of an engine upper half including an inducer coupled to the fan before the core inlet stator.

FIG. 4 is another example of a schematic representation of an engine upper half including an inducer section coupled to a fan.

FIG. 5A is a schematic representation of a speed reduction device comprises comprising a star gear type gearbox FIG. 5B is a schematic representation of a speed reduction device comprising a planetary gear type gearbox.

DETAILED DESCRIPTION

Figure 1:
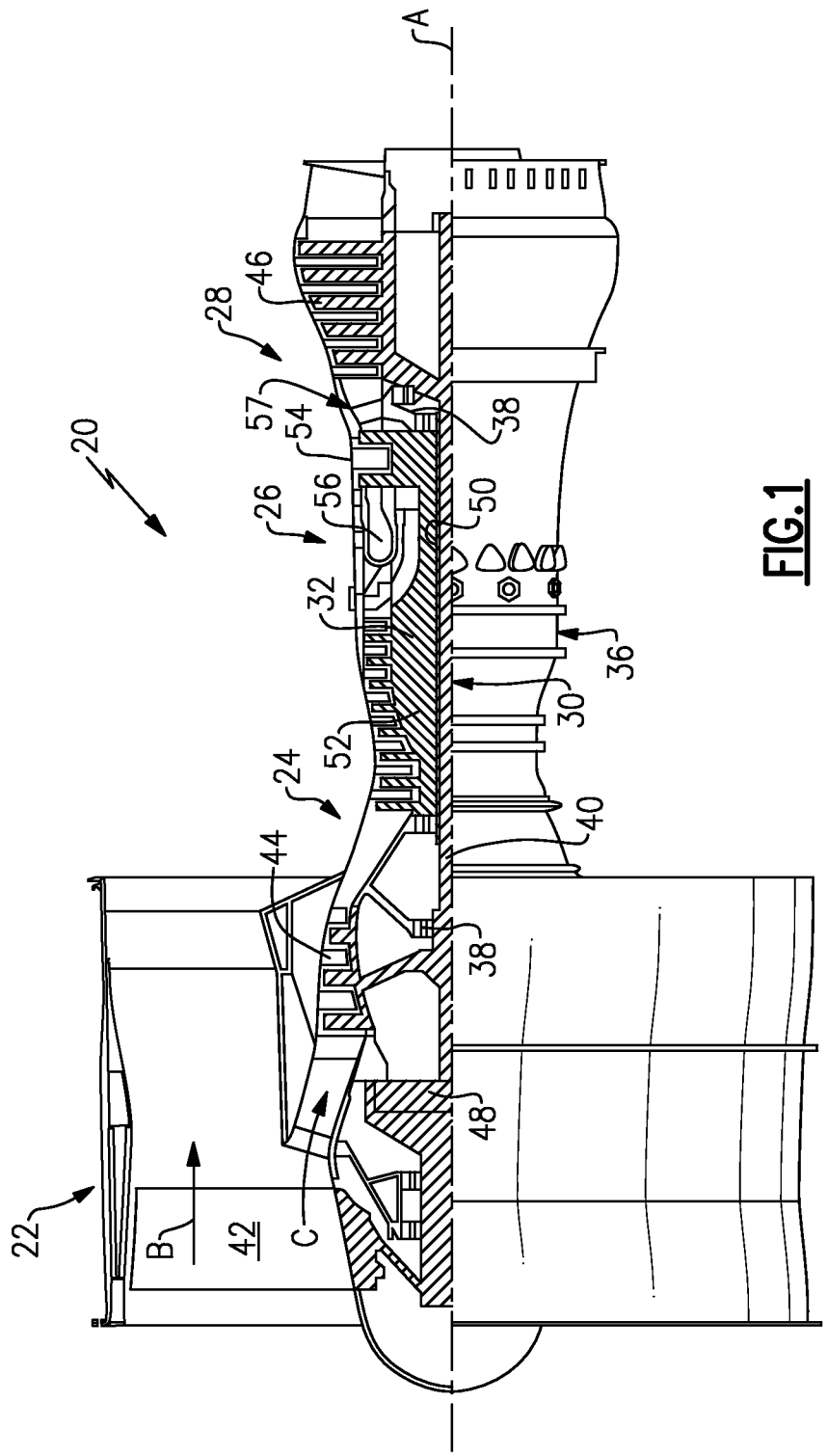
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a speed reduction device, such as a geared architecture 48 for example, to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm per hour of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ deg\ R)/518.7)^{\wedge}0.5]$. The "Low corrected fan tip speed" as disclosed herein according to one non-limiting embodiment is less than about 1150 ft/second.

A gas turbine engine 60 shown in FIG. 2 includes a two-spool turbofan as described above, which generally incorporates a fan section 22, a compressor section 24 with high 52 and low 44 pressure compressors, and a turbine section 28 with high 54 and low 46 pressure turbines. In this configuration, the low pressure turbine 46 is comprised of a plurality of stages. In the example shown, the low pressure turbine 46 includes a first stage 62, a second stage 64, and a third stage 66. The high pressure turbine 54 is comprised of a first stage 68 and a second stage 70 that are positioned forward of the plurality of stages 62, 64, 66 of the low pressure turbine 46.

Each of the stages for the high 54 and low 46 pressure turbines includes a plurality of blades coupled to a respective rotor. In the example shown, blades 71 of the low pressure turbine 46 are coupled to a first rotor 72 and blades 74 of the high pressure turbine 54 are coupled to a second rotor 76. The first rotor 72 is configured to drive the low shaft 40 and the second rotor 76 is configured to drive the high shaft 50. Each stage of the high 54 and low 46 pressure turbines also includes a plurality of vanes (not shown) interspersed with the blades where the vanes are mounted to a static engine structure 36.

The high pressure compressor 52 is comprised of first 80, second 82, third 84, and fourth 86 stages. The low pressure compressor 44 is comprised of first 88, second 90, third 92, and fourth 94 stages that are positioned forward of the plurality of stages 80, 82, 84, 86 of the high pressure compressor 52. Each of the stages of the high pressure compressor 52 includes a plurality of blades 96 that are coupled to a rotor 98 that is driven by the high shaft 50. Each of the stages of the low pressure compressor 44 is comprised of blades 100 that are coupled to a rotor 102 that is driven by the low shaft 40. Each stage of the high 52 and low 44 pressure compressors also includes a plurality of vanes (not shown) interspersed with the blades where the vanes are mounted to a static engine structure 36. Various bearings 38 rotatably support the high 50 and low 40 shafts as known.

The fan section 22 includes a fan 42 that is driven by the geared architecture 48. The fan 42 is comprised of a plurality of fan blades 104 that are coupled to a fan rotor 106 for rotation about the axis. The geared architecture 48 couples the low shaft 40 to the fan rotor 106 such that the fan rotor 106 rotates at a lower speed than the low shaft 40. The geared architecture 48 is an epicyclic gear arrangement that includes a plurality of star or planet gears driven by a sun gear fixed for rotation with the low shaft 40. The star gears drive a ring gear that is configured to drive the fan rotor 106.

The engine 60 also includes an inducer section 110 that comprises a fan-tied compressor stage, i.e. the inducer section is an additional compressor stage that is connected to the fan rotor 106. The inducer section 110 serves to efficiently feed the low pressure compressor 44 a more controlled/stabilized air flow. Alternatively, the inducer may allow the manufacturer to make one engine model without the inducer and use the exact same core on an engine model with the inducer. This approach would be a way of improving manufacturing efficiencies since the engine core with the inducer could in turn be used at higher thrust while maintaining the same peak core temperatures due to the higher air flows provided by the additional inducer stage or stages. In this way most of the engine part numbers would be common between the two models, thereby eliminating duplication in engineering work, development work, toolings, and other savings.

In one example, the inducer section 110 includes at least one inducer stage 112 that is driven by the fan rotor 106. The inducer stage 112 comprises one or more blade rows 114 fixed for rotation with the fan rotor 106 and a core stator structure 116 fixed to the non-rotating static engine structure 36. The core stator structure 116 is configured to facilitate reducing swirl coming off of the fan and diffusing the air flow. The core stator structure 116 includes one or more vanes 118 fixed to the static engine structure 36. Additional support for the stator structure 116 is provided by a connection to a strut 120. A bearing 122 rotatably supports the shaft 40 for rotation relative to the strut 120 and stator structure 116. A thrust bearing 148 also provides support for the fan and inducer assembly.

In one example shown in FIG. 2, the core stator structure 116 is positioned axially between the fan 42 and the blades 114 of the inducer stage 112.

In another example shown in FIG. 3, the core stator structure 116 is positioned aft of the blades 114 of the inducer stage 112.

In another example shown in FIG. 4, the at least one inducer stage comprises a plurality of inducer stages 112, 130 coupled to the fan rotor 106. FIG. 4 shows an example configuration having a first inducer stage 112 and a second inducer stage 130 that is configured similarly to the first inducer stage 112. The second inducer stage 130 comprises one or more blades 132 fixed for rotation with the fan rotor 106 and a core stator structure 116 fixed to the static engine structure 36 as described above. The core stator structure 116 can optionally include a second set of vanes 134 positioned aft of the blades 118 of the first inducer stage 112 and forward of the blades 132 of the second inducer stage 130. Optionally the vanes could be positioned respectively aft of each set of blades in a manner similar to that shown in FIG. 3.

In one example, the geared architecture 48 comprises a gearbox. FIGS. 5A and 5B shows two different examples of gearboxes. FIG. 5A shows a gearbox that comprises a star gear configuration. This configuration includes a sun gear 150 in meshing engagement with star gears 152 and a ring gear 154 in meshing engagement with the star gears 152. The sun gear 150 is driven by the shaft 40 and the ring gear 154 at drives the fan rotor 106.

FIG. 5B shows a gearbox that comprises a planetary gear configuration. This configuration includes a sun gear 160 in meshing engagement with a plurality of planetary gears 162 supported by a planet carrier 164 and a ring gear 166 in meshing engagement with the planet gears 162. The ring gear 166 is fixed to a static structure 36 and the planet carrier 164 provides input to the fan rotor 106.

In either of these configurations, the gearbox defines a gearbox axial center-plane P (see FIG. 2-4).

In one example, the low pressure compressor 44 is positioned immediately aft of the inducer section 110 and the inducer section 110 is positioned forward of the gearbox axial center-plane P.

In one example, the low pressure compressor 44 is positioned aft of the gearbox axial center-plane P.

The various configurations described above provide a geared turbofan with a slow turning, fan-tied auxiliary compressor stage or stages, and a separate higher speed low pressure compressor/low pressure turbine that are tied to a common single shaft. The fan-tied low pressure compressor stage or stages provide an inducer that is connected to the fan rotor immediately aft of the fan. This provides several benefits.

For example, the configurations disclosed above improve engine operability by fractionally reducing the pressure rise required of the higher speed low pressure compressor and moving that fractional pressure rise to the lower speed fan rotor utilizing the associated inducer stage. Moving low pressure compressor stages from the higher speed low pressure compressor shaft to the slower rotating fan rotor improves engine operability by reducing the inertia of the higher speed low pressure compressor and turbine, which are tied to the same single shaft. Relative to a configuration that does not have an inducer section, the inertia of the stages in an inducer configuration is decreased by a factor of 1/GR2 where GR2 is the square of the speed reduction ratio of the gear. For example, if the gear ratio GR is 2, locating a stage as fan-tied reduces the inertia of that low compressor stage by the factor of 0.25 relative to locating the stage within the higher speed low pressure compressor.

In another example, one or more of the core inlet stator vanes 118 could be a variable vane that rotates along a spanwise axis (as schematically indicated by dashed arrow 170 in FIG. 2) in order to better align the airfoil to the input flow. This would be especially desirable in reducing takeoff peak temperatures in the core.

In another example, the core inlet stator vanes 118 and/or the inducer blades 114, 132 could be heated for anti-icing conditions. A heating device is schematically shown at 174 in FIG. 4.

In one example, the fan 42 and inducer section 110 turn in the same direction as the fan drive turbine using a speed reduction device or a gearbox of the planet type as shown in FIG. 5B. In this configuration the sun gear 160 provides the input torque, the ring gear 166 is fixed to the supporting structure 36 and the carrier 164 of the gears 162 between the sun 160 and the ring gear 166 is connected to the fan hub 106 and provides the rotational torque required by the fan 42.

Further, for configurations where the gear is a star gear configuration that results in the fan rotating in an opposite direction to the rotational direction of the input shaft from the turbine (see FIG. 5A), the fan-tied low pressure compressor enables even more pressure to be addressed by the fan rotor 106 as the fan-tied low pressure compressor more easily accommodates more work being done by the fan rotor 106 than the counter rotating high speed low pressure compressor does without the presence of a fan-tied compressor stage. This also increases the supercharging temperature of the high speed low pressure compressor and, thus, results in a lower tip Mach number for the first rotor of the high speed low pressure compressor, resulting improved efficiency.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a shaft defining an axis of rotation;
   a speed reduction device driven by the shaft;
   a fan including a fan rotor driven by the speed reduction device; and
   at least one inducer stage positioned aft of the fan and coupled for rotation with the fan rotor.

2. The gas turbine engine according to claim 1, wherein the at least one inducer stage comprises one or more inducer blades fixed for rotation with the fan rotor and a core inlet stator fixed to a non-rotating engine structure.

3. The gas turbine engine according to claim 2, wherein the core inlet stator is positioned axially between the fan and the inducer blades.

4. The gas turbine engine according to claim 2, wherein the core stator is positioned aft of the blades.

5. The gas turbine engine according to claim 2, wherein the core inlet stator is a variable vane.

6. The gas turbine engine according to claim 2, wherein the core inlet stator is heated for anti-icing.

7. The gas turbine engine according to claim 2, wherein the one or more inducer blades are heated for anti-icing.

8. The gas turbine engine according to claim 1, wherein the at least one inducer stage comprises a plurality of inducer stages coupled to the fan rotor.

9. The gas turbine engine according to claim 8, wherein each inducer state comprises one or more blades fixed for rotation with the fan rotor and a core stator fixed to a non-rotating engine structure.

10. The gas turbine engine according to claim 1, including a compressor comprising a plurality of compressor stages driven by the shaft.

11. The gas turbine engine according to claim 10, wherein the compressor is positioned immediately aft of the at least one inducer stage.

12. The gas turbine engine according to claim 10, wherein the at least one inducer stage is positioned forward of the speed reduction device.

13. The gas turbine engine according to claim 10, wherein the compressor comprises a low pressure compressor, and including a high pressure compressor positioned aft of the low pressure compressor and driven by a second shaft positioned radially outwardly relative to the shaft that drives the low pressure compressor.

14. The gas turbine engine according to claim 1, wherein the fan rotor turns in the same direction as the shaft.

15. The gas turbine engine according to claim 1, wherein the fan rotor turns in an opposite direction from the shaft.

16. The gas turbine engine according to claim 1 wherein the speed change device comprises a gearbox including a sun gear in meshing engagement with star gears and a ring gear in meshing engagement with the star gears, and wherein the ring gear at drives the fan.

17. The gas turbine engine according to claim 1 wherein the speed change device comprises a gearbox including a sun gear in meshing engagement with a plurality of planetary gears supported by a planet carrier and a ring gear in meshing engagement with the planet gears, and wherein the ring gear is fixed and the planet carrier provides input to the fan.

18. A gas turbine engine comprising:
    a shaft defining an axis of rotation;
    a speed change device driven by the shaft;
    a fan section including at least one fan blade coupled to a fan rotor wherein the fan rotor is driven by the speed change device;
    a compressor comprising a plurality of compressor stages driven by the shaft; and
    at least one inducer stage positioned aft of the fan blade and coupled for rotation with the fan rotor about the axis of rotation.

19. The gas turbine engine according to claim 18, wherein the at least one inducer stage is positioned axially forward of the compressor.

20. The gas turbine engine according to claim 19, wherein the compressor comprises a low pressure compressor, and including a high pressure compressor positioned aft of the low pressure compressor and driven by a second shaft positioned radially outwardly relative to the shaft that drives the low pressure compressor.

21. The gas turbine engine according to claim 20, wherein the low pressure compressor is positioned aft of the speed change device.

22. The gas turbine engine according to claim 18, wherein the at least one inducer stage comprises one or more inducer blades fixed for rotation with the fan rotor and a core inlet stator fixed to a non-rotating engine structure.

23. The gas turbine engine according to claim 22, wherein the core inlet stator is positioned axially between the fan blades and the inducer blades.

24. The gas turbine engine according to claim 22, wherein the core inlet stator is positioned aft of the inducer blades.

25. The gas turbine engine according to claim 18, wherein the at least one inducer stage comprises a plurality of inducer stages coupled to the fan rotor, and wherein each inducer stage comprises one or more inducer blades fixed for rotation with the fan rotor and a core inlet stator fixed to a non-rotating engine structure.

26. The gas turbine engine according to claim 18, wherein the compressor is positioned aft of the at least one inducer stage.

27. The gas turbine engine according to claim 26, wherein the at least one inducer stage is positioned forward of the speed change device.

* * * * *